Figure 1:
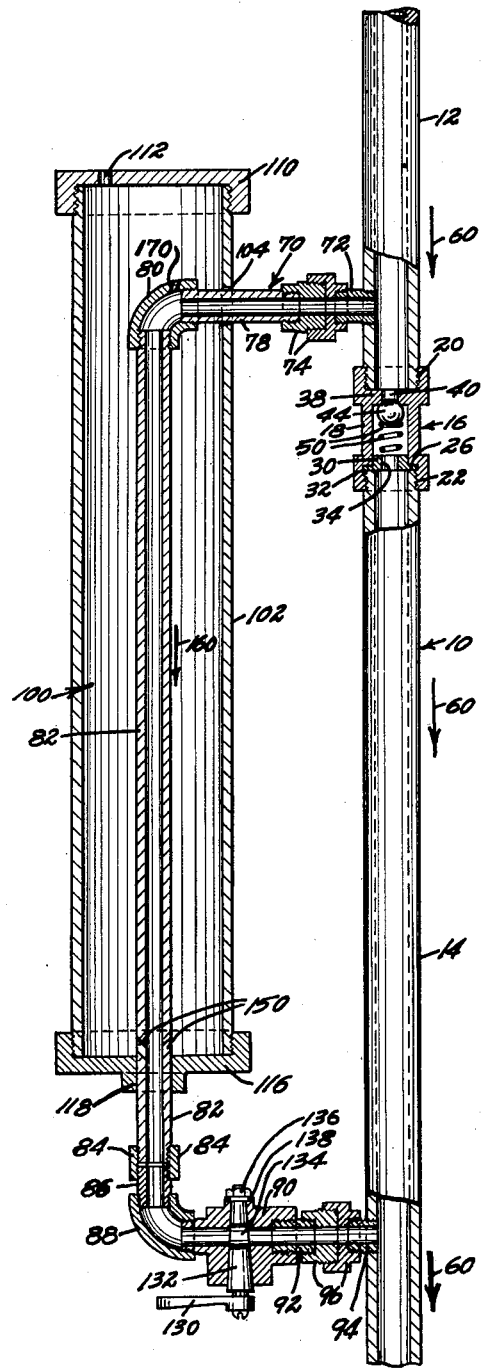

March 6, 1956

L. INGRAM 2,737,199

SIPHON MIXER

Filed March 6, 1952

INVENTOR.
BY Louis Ingram
A. Hiram Sturges 2,737,199
SIPHON MIXER

Louis Ingram, Valley, Nebr.

Application March 26, 1952, Serial No. 278,665

1 Claim. (Cl. 137—268)

This invention relates to washing apparatus and more particularly it is an object of this invention to provide an apparatus for washing oil, grease and mud from the engines of cars, from the exterior of cars preparatory to painting, and other uses.

It is an object of this invention to provide an effective and simply constructed mixer for mixing water with soap, other detergent, or water softening materials.

Still a further object is to provide a mixer which is capable of mixing not only a soap or detergent solution with hot water to form a thinner washing mixture but which also can be used to mix granulated particles with water for this purpose.

A particular object is to provide a device of the type described having at least one, and preferably more than one, passage slanting from a soap chamber through a water pipe, the passage slanting from the outer end of the water pipe downstream toward the inner end thereof for the passage therethrough of granulated particles of water softening materials, soap, or other detergent.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings, the figure is a side elevation of the siphon mixer of this invention mostly shown in sections for convenience of illustration.

The mixer of this invention is attached to a main or by-pass type pipe generally indicated at 10 and having first and second sections 12 and 14. Between the sections 12 and 14, a check valve generally indicated at 16 is provided.

The check valve 16 has a housing 18 internally threaded at each end as shown at 20 and 22. One end of the housing 18 is threadedly secured at 22 to the second pipe section 14.

Between the end of the second pipe section 14 and the shoulder 26 on the valve housing 18 is an annular member 30 having an outwardly extending flange 32 for engagement against the shoulder 26. The annular member 30 has an aperture 34 through the center thereof for the passage of water therethrough. At the upper end of the housing 18 a constricted portion 38 is provided having at its center an opening 40.

A ball 44 is held against the lower wall of the opening 40 by a compression spring 50 which latter has its ends against the ball 44 and against the annular member 34.

Water in the pipe 10 flows in the direction of the arrows 60 and a side arm pipe generally indicated at 70 is attached to the upper section 12 of the main by-pass pipe 10 upstream from the check valve 16.

The side arm pipe 70 includes many sections and couplings including a nipple 72 threadedly engaged with the upper section 12 of the by-pass pipe 10; union members 74 which attach the nipple 72 to an elongated horizontal pipe section 87; an elbow 80 attaching the outer end of a section 78 to a vertical pipe section 82, a right and left hand threaded coupling 84 attaching the pipe section 82 with a nipple 86; an elbow 88 connecting the nipple 86 with a valve 90 and a nipple 92 on the other end of the valve 90; a nipple 94 connected to the lower or second section 14 of the main pipe 10; and two union members 96 connecting the nipples 92 and 94 together. The foregoing elements form parts of what for convenience will be termed the side arm pipe generally designated by the numeral 70.

A soap chamber generally indicated at 100 is disposed about the vertical section 82 of the side arm pipe 70. The soap chamber 100 has a cylinder portion 102 extending around the vertical pipe section 82. The cylinder 102 has an opening 104 therethrough for receiving the horizontal pipe section 78.

The upper end of the cylinder 102 is threaded for receiving an internally threaded cap member 110 having an aperture 112 for the admission of air into the soap chamber 100.

The lower end of the cylinder 102 is similarly threadedly secured to the internally threaded upper end of a bottom cap 116 which latter has an opening 118 extending vertically therethrough for receiving the lower end of the vertical pipe section 82.

The valve 90 has a handle 130 for rotating its stem 132. The stem 132 has an aperture 134 therethrough and the stem is held in place by a nut 136 and a washer 138.

At the lower end of the soap chamber 100 the vertical pipe section 82 has at least one and preferably two passageways 150 therethrough. It will be understood that the passageways 150 are each slanted from the outer ends thereof downstream in the direction of the arrow 160 toward the inner ends thereof. When the pipe 82 is disposed in upright position the passages 150 slant downwardly and inwardly from their upper outer ends to their lower inner ends.

The soap chamber 100 is for the purpose of receiving soap in either liquid or granulated form. It can also be used for receiving other detergent or water softening materials. The size of the passages 150 must be large enough so that granules can pass therethrough from the chamber 100 into the pipe section 82 and yet small enough that water does not rush outwardly from the pipe 82 into the chamber 100.

In operation, it will be seen that the valve 90 controls the rate of flow through the side arm pipe 70 and thereby controls the ratio of the quantity of water which passes by the check valve 16 to the quantity which passes through the side arm pipe 70.

By regulating the valve 90 an operator can control the amount of detergent which passes out of the lower main pipe section 14 because the check valve will permit water to pass in proportion to the pressure against it.

At the top of the soap chamber 100 the side-arm pipe 70 has an air passage 170 through the elbow section 80 thereof. The passage 170 is to admit air to the pipe 82.

The pressure of the air passage 170 reduces the tendency of the mixture in the bottom of the side-arm pipe 82 to become overly thick when the valve 90 is shut off. The passage 170 must be small to admit air without water entering the soap chamber 100.

When the valve 90 is shut off the water in the side arm pipe 70 above the valve 90 tends to be siphoned upwardly, drawing soap into the side arm pipe through the passage 150 to an excessive extent making the solution in the side arm pipe overly thick. The presence of the passage 170 admits air to the side arm pipe breaking the vacuum caused by this siphon effect whereby excessive amounts of soap are not drawn into the side arm pipe 70.

The passage 170 must be small to admit air into the side arm pipe without water entering the soap chamber 100 through the passage 170.

The opening 112 in the cap 110 is optional as there is usually sufficient air between the soap granules in the chamber 100 to serve the purpose of breaking the siphon effect just described.

From the foregoing description it is thought to be obvious that a siphon mixer constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

A mixer comprising: a soap chamber; a main by-pass flow pipe having water flowing therethrough; a side-arm pipe attached to and in communication with said main pipe, said side-arm pipe having a vertical portion extending through said soap chamber, the lower end of said vertical portion being in communication with said main by-pass pipe downstream from said first-mentioned side-arm pipe attachment point, said vertical portion having at least one passageway therethrough adjacent the lower end of said chamber and within said chamber, said passageway being slanted from the outer end thereof downwardly toward the inner end thereof; means for admitting air into said soap chamber; a valve for controlling the flow of water through said side-arm pipe; and a spring loaded check valve in said main by-pass line between the points of communication between said main pipe and the ends of said side-arm pipe for limiting flow through said main pipe.

References Cited in the file of this patent

UNITED STATES PATENTS

| | | |
|---|---|---|
| Re. 20,262 | Lane | Feb. 9, 1937 |
| 1,248,573 | Swimmer | Dec. 4, 1917 |
| 1,397,344 | Swimmer | Nov. 15, 1921 |
| 2,296,718 | Kyprie | Sept. 22, 1942 |
| 2,461,067 | Lewis | Feb. 8, 1949 |
| 2,538,720 | Wood | Jan. 16, 1951 |
| 2,553,977 | Mau | May 22, 1951 |
| 2,611,648 | Risher | Sept. 23, 1952 |

FOREIGN PATENTS

| | | |
|---|---|---|
| 114,811 | Austria | 1929 |